(12) United States Patent
Kiser

(10) Patent No.: US 6,242,113 B1
(45) Date of Patent: Jun. 5, 2001

(54) WELDING ALLOY AND ARTICLES FOR USE IN WELDING, WELDMENTS AND METHODS FOR PRODUCING WELDMENTS

(75) Inventor: Samuel D. Kiser, Lenoir, NC (US)

(73) Assignee: Inco Alloys International, Inc., Huntington, WV (US)

( * ) Notice: Subject to any disclaimer, the term of this patent is extended or adjusted under 35 U.S.C. 154(b) by 0 days.

(21) Appl. No.: 09/328,602

(22) Filed: Jun. 10, 1999

(51) Int. Cl.$^7$ ............ B32B 15/00; C22C 19/05; B23K 35/34

(52) U.S. Cl. .......... 428/680; 148/516; 148/527; 148/428; 219/76.1; 219/121.11; 219/137 WM; 219/145.22; 219/145.23; 219/146.23; 420/446; 420/447; 420/448; 420/449; 420/450; 420/452; 420/454; 420/459; 420/460; 428/386; 428/544; 428/546; 428/577

(58) Field of Search ............ 428/544, 546, 428/577, 680, 386; 420/446, 447, 448, 449, 450, 454, 459, 460, 452; 148/516, 527, 428; 219/76.1, 121.11, 137 WM, 145.22, 145.23, 146.23, 146.41

(56) References Cited

U.S. PATENT DOCUMENTS

| | | | |
|---|---|---|---|
| 4,010,309 | 3/1977 | Petersen | 428/386 |
| 5,077,006 | * 12/1991 | Culling | 420/454 |
| 5,543,109 | * 8/1996 | Senba et al. | 420/446 |

FOREIGN PATENT DOCUMENTS

| | | |
|---|---|---|
| 1086288 | 10/1967 | (GB) . |
| 1481831 | 8/1977 | (GB) . |

OTHER PUBLICATIONS

PCT Search Report, PCT/US00/11855; Sep. 11, 2000.
"The Microstructure and Corrosion Resistance of Nickel–Based Filler Metals with High Chromium Contents", *Welding Journal*, Feb., 1990, No. 2, Miami FL, pp. 60–67, by C. L. Briant and E. L. Hall.

\* cited by examiner

Primary Examiner—Deborah Jones
Assistant Examiner—Robert R. Koehler
(74) Attorney, Agent, or Firm—Robert F. Dropkin, Esq.

(57) ABSTRACT

A nickel, chromium, iron alloy for use in producing weld deposits. The alloy comprises, in weight percent, about 27 to 31.5 chromium; about 7 to 11 iron; about 0.005 to 0.05 carbon; less than about 1.0 manganese, preferably 0.30 to 0.95 manganese; about 0.60 to 0.95 niobium; less than 0.50 silicon, preferably 0.10 to 0.30 silicon; 0.01 to 0.35 titanium; 0.01 to 0.25 aluminum; less than 0.20 copper; less than 1.0 tungsten; less than 1.0 molybdenum; less than 0.12 cobalt; less than 0.10 tantalum; less than about 0.10 zirconium, preferably 0.002 to 0.10 zirconium; less than about 0.01 sulfur; less than about 0.01 boron, preferably 0.001 to 0.01 boron; less than about 0.02 phosphorous; and balance nickel and incidental impurities.

18 Claims, No Drawings

WELDING ALLOY AND ARTICLES FOR USE IN WELDING, WELDMENTS AND METHODS FOR PRODUCING WELDMENTS

BACKGROUND OF THE INVENTION

1. Field of the Invention

This invention relates to a nickel, chromium, iron welding alloy, articles made therefrom for use in producing weldments, and weldments and methods for producing these weldments.

2. Brief Description of the Prior Art

In various welding applications, including equipment used in nuclear power generation, weldments are required that provide resistance to various cracking phenomenon. This includes not only stress corrosion cracking but hot cracking, cold cracking, and root cracking as well.

Commercial and military nuclear power generation have only existed within the second half of the $20^{th}$ century. During this time, the industry has replaced the first generation of NiCrFe alloys having 14 to 15 percent chromium with alloys having higher chromium contents on the order of 30 percent. This change was predicated on the discovery that stress corrosion cracking in nuclear pure water could be avoided with alloys of this type that contained chromium in this amount. These alloys have been in use for about 20 to 25 years.

The specific application for nuclear power generation equipment that requires the majority of welding and welded products within the nuclear power plant is the fabrication of the nuclear steam generator. This equipment is essentially a large tube and shell heat exchanger that generates steam from secondary water from primary nuclear reactor coolant. The key component of this steam generator is the tubesheet. It is sometimes 15 to 20 feet in diameter and well over a foot thick and is usually forged from a high strength low alloy steel that must be weld overlaid with a NiCrFe alloy that has good fabric ability and is resistant to stress corrosion cracking in nuclear pure water. Due to the size of the tubesheet, the weld deposit sustains substantial residual stress during overlay. Furthermore, the weld metal overlay must be capable of being rewelded after being drilled to provide openings therein to receive thousands of small steam generator tubes. These tubes must be seal-welded to the overlay weld deposit to make helium-leak-tight welds. These welds must be of extraordinary high quality and must provide 30 to 50 year life with high predictability. In addition, in both the overlay weld deposit and the welded steam generator tubes, excellent crack resistance must be provided. This requirement, with respect to resistance to hot cracking, also termed "solidification cracking," and stress corrosion cracking has been met by most of the existing 30% chromium weldments.

In addition to hot cracking resistance and stress corrosion cracking resistance, the tube-to-tubesheet welds require root cracking resistance. The tube-to-tubesheet weld is made by melting the tube end together with a ring of the weld overlay material surrounding the tube (with or without the use of additional filler metal) to thereby seal the space between the tube wall and the opening in the tubesheet. There is a tendency for these welds to crack at the intersection of the weld at the joiner of the tube to the tubesheet. This type of cracking is referred to as "root cracking" because it occurs at the root of the weld. The existing 30% chromium welding alloys are not resistant to root cracking.

A third type of cracking that may be encountered is cold cracking, also known as "ductility dip cracking." This cracking only occurs in the solidified state after weld solidification has been completed. After solidification occurs, shrinkage stresses begin to develop as a result of the reduction in volume of the welding alloy at lower temperature. At the same time, once solidification is complete, ductility recovery occurs rapidly for a few hundred degrees, followed by a sharp temporary loss in ductility, and again followed by a more gradual continuous recovery of ductility until ambient temperature is reached. If the residual stress of cool-down is sufficiently large when the alloy exhibits this sharp ductility loss, solid state cracking may occur. This results from portions of the microstructure not having sufficient strength or ductility to resist the stress at the prevailing temperature. The commercially available 30% chromium welding alloys presently available are not sufficiently resistant to cold cracking.

OBJECTS OF THE INVENTION

It is an object of the present invention to provide a nickel, chromium, iron welding alloy and weldments made therefrom that provides the desired strength and corrosion resistance in addition to resistance to hot cracking, cold cracking, root cracking, as well as stress corrosion cracking.

A further object of the invention is to provide a welding alloy of the nickel, chromium, iron type that is particularly adapted for uses in fabricating equipment used in nuclear power generation.

SUMMARY OF THE INVENTION

In accordance with the invention there is provided a nickel, chromium, iron alloy for use in producing weld deposits. The alloy comprises, in weight percent, about 27 to 31.5 chromium; about 7 to 11 iron; about 0.005 to 0.05 carbon; less than about 1.0 manganese, preferably 0.30 to 0.95 manganese; about 0.60 to 0.95 niobium; less than 0.50 silicon, preferably 0.10 to 0.30 silicon; 0.01 to 0.35 titanium; 0.01 to 0.25 aluminum; less than 0.20 copper; less than 1.0 tungsten; less than 1.0 molybdenum; less than 0.12 cobalt; less than 0.10 tantalum; less than about 0.10 zirconium, preferably 0.002 to 0.10 zirconium; less than about 0.01 sulfur; less than about 0.01 boron, preferably 0.001 to 0.01 boron; less than about 0.02 phosphorous; and balance nickel and incidental impurities.

The alloy will exhibit adequate stress corrosion cracking resistance in view of the chromium content. The alloy may be in the form of a weld deposit, a welding electrode, a welding electrode in the form of a wire with a flux cover, a welding electrode in the form of a sheath with a flux core, a weld deposit overlay or a weldment comprising an alloy substrate, such as steel with an overlay of the invention alloy. It may be used in a method for producing a weld deposit or weldment in the form of a flux-covered electrode used for producing a weld deposit that includes welding performed by submerged arc welding or electroslag welding. The weldment may be in the form of a tubesheet of a nuclear reactor. It may be further used as an article for producing a weldment, with the article being in the form of wire, strip, sheet, rod, electrode, prealloyed powder, or elemental powder. The method for producing the weld deposit may include producing a flux-covered electrode of a nickel, chromium wire, or a nickel, chromium, iron wire and melting the electrode to produce a weld deposit.

DESCRIPTION OF THE PREFERRED EMBODIMENTS

The NiCrFe welding alloy in accordance with the invention has sufficient chromium along with considerably tight control of secondary chemical constituents, as well as trace elements, to provide suitable corrosion resistance in addition to excellent stress corrosion cracking resistance. In addition, the alloy must be resistant to solidification cracking, to root cracking, and to cold cracking under reheat conditions.

To confer resistance to solidification cracking, the alloy should have adequate solubility for its alloying elements and a narrow liquidus to solidus temperature range. Also, it should have low levels of sulfur, phosphorus, and other low-melting elements and it should contain minimum levels of elements that form low-melting point phases in the alloy.

The resistance to cold cracking is controlled by increasing the high-temperature strength and ductility at the grain boundaries. This is accomplished by the careful combination of niobium, zirconium and boron in accordance with the limits of the invention. Niobium is required to be restricted to avoid the formation of secondary phases while contributing to grain boundary strength in the solid state. Niobium is also required for resistance to stress corrosion cracking. Boron contributes to grain boundary strength and improves hot ductility, but at higher levels than in accordance with the invention is detrimental to hot cracking resistance. Zirconium improves solid state strength and ductility at the grain boundaries and improves the oxidation resistance at the grain boundaries. At higher levels than in accordance with the invention, zirconium contributes to hot cracking. At boron and zirconium levels lower than in accordance with the invention, there is relatively little resistance to cold cracking. As boron alone is added, there appears to be very slight improvement to cold cracking resistance, but with boron in conjunction with zirconium at levels in accordance with the invention, cold cracking is substantially eliminated.

Resistance to root cracking may be achieved in accordance with the invention, but this cannot be guaranteed because of variations in joint conditions, such as the clearance between the articles to be welded, cleanliness, and relative movement during welding, that are beyond the control of the welded product designer. The alloy of the invention requires low aluminum and titanium coupled with controlled niobium, silicon, boron, zirconium, and manganese to achieve the desired metallurgical properties. These requirements may be met while maintaining optimum hot-cracking, cold cracking, and stress -corrosion-cracking resistance. Aluminum and titanium should be kept as low as possible for root cracking resistance, but even small amounts of titanium are beneficial to stress corrosion cracking resistance. Silicon is not particularly detrimental to root cracking resistance when maintained below 0.50% and since silicon is preferred to be less than 0.30% for other reasons, this is an acceptable level. With the advent of AOD melting practices that have the capability to produce very low levels of sulfur, substantial manganese additions are not necessary. In fact, manganese levels above 7% lead to metallurgical instabilities, with exposures to temperatures above 1000° F. Manganese additions between 1% and 5% were once thought to be needed to combat both hot cracking and root cracking. The instant invention requires manganese to be kept below 1.0% and preferably about 0.80% for resistance to hot cracking, but at the same time, due to the balance of other constituents, less than 1.0% manganese is sufficient to avert root cracking.

TABLE 1

Weld Deposit Chemical Compositions and Cracking Results

| ELEMENT | 1111 SAS | 1112 SAS | 1113 SAS | 1114 SAS | 1121 SAS | 1124 SAS | 1125 SAS | 1126 ESS | 1127 SAS | 1128 ESS | 1129 ESS | 1130 SAS | FM52 GMAW NX9714 |
|---|---|---|---|---|---|---|---|---|---|---|---|---|---|
| C | 0.0117 | 0.0117 | NA | NA | 0.055 | 0.038 | 0.032 | 0.041 | 0.041 | 0.012 | 0.012 | 0.012 | 0.02 |
| MN | 0.86 | 0.83 | 0.77 | 0.82 | 0.82 | 0.85 | 0.8 | 1.31 | 0.75 | 1.58 | 1.64 | 0.57 | 0.27 |
| FE | 15.77 | 16.22 | 15.7 | 16.55 | 15.44 | 13.91 | 12.75 | 11.49 | 13.64 | 11.14 | 10.26 | 16.32 | 0.92 |
| S | 0.001 | 0.001 | NA | NA | 0.007 | 0.002 | 0.002 | 0.001 | 0.002 | 0.001 | 0.001 | 0.001 | 0.001 |
| SI | 0.27 | 0.28 | 0.25 | 0.27 | 0.27 | 0.28 | 0.28 | 0.28 | 0.27 | 0.57 | 0.49 | 0.27 | 0.13 |
| CU | 0.05 | 0.05 | 0.05 | 0.04 | 0.03 | 0.04 | 0.04 | 0.05 | 0.04 | 0.05 | 0.05 | 0.04 | 0.01 |
| NI | 53.33 | 53.16 | 53.63 | 52.96 | 53.64 | 54.65 | 55.61 | 56.43 | 55.11 | 56.77 | 57.53 | 53.29 | 60.6 |
| CR | 26.7 | 28.5 | 26.73 | 28.48 | 28.65 | 29.3 | 29.59 | 29.23 | 29.3 | 28.18 | 28.34 | 28.62 | 28.88 |
| AL | 0.06 | 0.06 | 0.06 | 0.06 | 0.12 | 0.05 | 0.07 | 0.06 | 0.06 | 0.12 | 0.11 | 0.05 | 0.67 |
| TI | 0.05 | 0.05 | 0.04 | 0.04 | 0.01 | 0.05 | 0.05 | 0.03 | 0.05 | 0.06 | 0.05 | 0.05 | 0.51 |
| NB | 0.554 | 0.542 | 0.65 | 0.67 | 0.609 | 0.706 | 0.68 | 0.984 | 0.626 | 1.43 | 1.42 | 0.59 | 0.01 |
| B | 0.001 | 0.002 | 0.004 | 0.008 | 0.005 | 0.0018 | 0.0016 | 0.0017 | 0.0012 | 0.003 | 0.002 | 0.002 | NA |
| ZR | 0.001 | 0.001 | 0.001 | 0.001 | 0.001 | 0.005 | 0.004 | 0.004 | 0.004 | 0.011 | 0.012 | 0.006 | NA |
| P | 0.001 | 0.001 | 0.007 | 0.006 | 0.007 | 0.006 | 0.006 | 0.006 | 0.006 | 0.007 | 0.007 | 0.006 | 0.004 |
| hotcrack | NT | NT | N | N | Y | N | N | N | N | N | N | N | N |
| coldcrak | NT | NT | Y | Y | Y | N | N | N | N | Y | N | N | Y |
| rootcrak | NT | NT | NT | NT | NT | N | N | NT | N | Y | Y | NT | Y |

| ELEMENT | WEI52 SMAW WC95D8 | EXP T/T ESS | EXP F1 ESS | EXP F2 ESS | EXP F3 ESS | EXP F4 ESS | 1131 ESS | 1132 ESS | 1133 ESS | 1134 ESS |
|---|---|---|---|---|---|---|---|---|---|---|
| C | 0.03 | 0.02 | 0.028 | 0.026 | 0.027 | 0.027 | 0.014 | 0.022 | 0.028 | 0.046 |
| MN | 3.29 | 1.12 | 0.09 | 2.03 | 3.2 | 1.02 | 1.69 | 1.66 | 1.22 | 0.767 |
| FE | 9.22 | 8.27 | 9.09 | 9.01 | 8.75 | 8.18 | 11.2 | 12.04 | 12.69 | 14.93 |
| S | 0.005 | 0.003 | 0.007 | 0.008 | 0.007 | 0.0017 | 0.0008 | 0.0008 | 0.0008 | 0.0008 |
| SI | 0.5 | 0.26 | 0.63 | 0.46 | 0.51 | 0.235 | 0.443 | 0.382 | 0.155 | 0.195 |
| CU | 0.01 | 0.02 | 0.03 | 0.03 | 0.03 | NA | 0.026 | 0.024 | 0.023 | 0.027 |
| NI | 56.31 | 58.54 | 58.5 | 58.51 | 56.54 | 56.64 | 58.98 | 58.73 | 58.7 | 57.29 |
| CR | 28.67 | 30.25 | 29.67 | 29.33 | 29.08 | 30.07 | 28.22 | 25.76 | 27.03 | 26.98 |
| AL | 0.2 | 0.015 | 0.104 | 0.068 | 0.071 | 0.018 | 0.04 | 0.042 | 0.02 | 0.09 |
| TI | 0.11 | 0.02 | 0.1 | 0.068 | 0.073 | 0.02 | 0.03 | 0.028 | 0.01 | 0.03 |
| NB | 1.55 | 1.34 | 0.017 | 0.016 | 0.016 | 1.01 | 1.42 | 1.52 | 0.792 | 0.57 |
| B | NA | NA | NA | NA | NA | NA | 0.002 | 0.002 | 0.001 | 0.001 |

TABLE 1-continued

Weld Deposit Chemical Compositions and Cracking Results

| | | | | | | | | | | |
|---|---|---|---|---|---|---|---|---|---|---|
| ZR | NA | NA | NA | NA | NA | NA | 0.009 | 0.008 | 0.002 | 0.003 |
| P | 0.005 | 0.001 | 0.0023 | 0.0014 | 0.002 | 0.005 | 0.018 | 0.015 | 0.0187 | 0.0124 |
| hotcrack | N | N | N | Y | Y | N | | N | | |
| coldcrak | Y | Y | Y | Y | Y | Y | | N | | |
| rootcrak | Y | Y | Y | Y | Y | N | | | | |

Legend: no cracking = N, cracking found = Y, not tested = NT

All of the alloys of Table 1 exhibit the required strength and corrosion resistance for welding applications, including the fabrication of equipment used in nuclear power generation. The crack-test results presented in Table 1 demonstrate that NiCrFe welding alloy compositions in accordance with the invention additionally provide improved crack resistance over conventional alloys of this type. This includes, in combination, resistance to hot cracking, cold cracking, and root cracking, as well as stress corrosion cracking.

As may be seen from Table 1, sample melt numbers 1124, 1125, and 1127 are free of cracks of all types and thus constitute alloys within the scope of the invention. Each of these samples have low silicon and the required amounts of boron and zirconium. Sample 1128 exhibited both cold cracking and root cracking because of the unacceptably high silicon content even with boron and zirconium within the limits of the invention.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A nickel, chromium, iron alloy, said alloy comprising, in weight percent, about 27 to 31.5 chromium; about 7 to 11 iron; about 0.005 to 0.05 carbon; less than about 1.0 manganese; about 0.60 ti 0.95 niobium; less than 0.50 silicon; 0.01 to 0.35 titanium; 0.01 to 0.25 aluminum; less than 0.20 copper; less than 1.0 tungsten; less than 1.0 molybdenum; less than 0.12 cobalt; less than 0.10 tantalum; less than about 0.10 zirconium; less than 0.01 sulfur; less than 0.01 boron; less than 0.02 phosphorous; and balance nickel and incidental impurities.

2. The alloy of claim 1, comprising 0.30 to 0.95 manganese, 0.002 to 0.10 zirconium, 0.001 to 0.01 boron, and 0.10 to 0.30 silicon.

3. A nickel, chromium, iron weld deposit comprising, in weight percent, about 27 to 31.5 chromium; about 7 to 11 iron; about 0.005 to 0.05 carbon; less than about 1.0 manganese; about 0.60 to 0.95 niobium; less than 0.50 silicon; 0.01 to 0.35 titanium; 0.01 to 0.25 aluminum; less than 0.20 copper; less than 1.0 tungsten; less than 1.0 molybdenum; less than 0.12 cobalt; less than 0.10 tantalum; less than about 0.10 zirconium; less than 0.01 sulfur; less than about 0.01 boron; less than 0.02 phosphorous; and balance nickel and incidental impurities.

4. The weld deposit of claim 3, comprising 0.30 to 0.95 manganese, 0.002 to 0.10 zirconium, 0.001 to 0.01 boron, and 0.10 to 0.30 silicon.

5. A welding electrode that produces a weld deposit comprising, in weight percent, about 27 to 31.5 chromium; about 7 to 11 iron; about 0.005 to 0.05 carbon; less than about 1.0 manganese; about 0.60 to 0.95 niobium; less than 0.50 silicon; 0.01 to 0.35 titanium; 0.01 to 0.25 aluminum; less than 0.20 copper; less than 1.0 tungsten; less than 1.0 molybdenum; less than 0.12 cobalt; less than 0.10 tantalum; less than about 0.10 zirconium; less than 0.01 sulfur; less than about 0.01 boron; less than 0.02 phosphorous; and balance nickel and incidental impurities.

6. The welding electrode of claim 5, that produces a weld deposit comprising 0.30 to 0.95 manganese, 0.002 to 0.10 zirconium, 0.001 to 0.01 boron, and 0.10 to 0.30 silicon.

7. The welding electrode of claims 5 or 6, comprising a nickel, chromium, iron wire with a flux cover.

8. The electrode of claims 5 or 6, comprising, a nickel, chromium, iron sheath with a flux core.

9. A weldment comprising an alloy substrate and a weld deposit overlay thereon, said weld deposit overlay comprising, in percent by weight, about 27 to 31.5 chromium; about 7 to 11 iron; about 0.005 to 0.05 carbon; less than about 1.0 manganese; about 0.60 to 0.95 niobium; less than 0.50 silicon; 0.01 to 0.35 titanium; 0.01 to 0.25 aluminum; less than 0.20 copper; less than 1.0 tungsten; less than 1.0 molybdenum; less than 0.12 cobalt; less than 0.10 tantalum; less than about 0.10 zirconium; less than 0.01 sulfur; less than about 0.01 boron; less than 0.02 phosphorous; and balance nickel and incidental impurities.

10. The weldment of claim 9, comprising 0.30 to 0.95 manganese, 0.002 to 0.10 zirconium, 0.001 to 0.01 boron, and 0.10 to 0.30 silicon.

11. The weldment of claims 9 or 10, in the form of a tubesheet of a nuclear steam generator.

12. A method for producing a weld deposit, comprising producing a flux-covered electrode of a nickel, chromium, iron wire or a nickel, chromium, iron wire, and melting said electrode to produce a weld deposit comprising, in weight percent, about 27 to 31.5 chromium; about 7 to 11 iron; about 0.005 to 0.05 carbon; about less than about 1.0 manganese; about 0.60 to 0.95 niobium; less than 0.50 silicon; 0.01 to 0.35 titanium; 0.01 to 0.25 aluminum; less than 0.20 copper; less than 1.0 tungsten; less than 1.0 molybdenum; less than 0.12 cobalt; less than 0.10 tantalum; less than about 0.10 zirconium; less than 0.01 sulfur; less than about 0.01 boron; less than 0.02 phosphorous; and balance nickel and incidental impurities.

13. The method of claim 12 for producing a weld deposit, comprising 0.30 to 0.95 manganese, 0.002 to 0.10 zirconium, 0.001 to 0.01 boron, and 0.10 to 0.30 silicon.

14. The method of claims 12 or 13, wherein said melting of said electrode is performed by submerged arc welding or electroslag welding.

15. A method for producing a weldment, comprising forming an electrode of a nickel, chromium, iron alloy comprising, in weight percent, about 27 to 31.5 chromium; about 7 to 11 iron; about 0.005 to 0.05 carbon; less than about 1.0 manganese; about 0.60 to 0.95 niobium; less than 0.50 silicon; 0.01 to 0.35 titanium; 0.01 to 0.25 aluminum; less than 0.20 copper; less than 1.0 tungsten; less than 1.0 molybdenum; less than 0.12 cobalt; less than 0.10 tantalum; less than about 0.10 zirconium; less than 0.01 sulfur; less than about 0.01 boron; less than 0.02 phosphorous; and balance nickel and incidental impurities; and using said electrode to produce a weldment.

16. The method for producing a weldment of claim 15, comprising 0.30 to 0.95 manganese, 0.002 to 0.10 zirconium, 0.001 to 0.01 boron, and 0.10 to 0.30 silicon.

17. An article for use in producing a weldment, said article being in the form of wire, strip, sheath, rod, electrode, prealloyed powder, or elemental powder, with said article comprising, in weight percent, about 27 to 31.5 chromium; about 7 to 11 iron; about 0.005 to 0.05 carbon; less than about 1.0 manganese; about 0.60 to 0.95 niobium; less than 0.50 silicon; 0.01 to 0.35 titanium; 0.01 to 0.25 aluminum; less than 0.20 copper; less than 1.0 tungsten; less than 1.0 molybdenum; less than 0.12 cobalt; less than 0.10 tantalum; less than about 0.10 zirconium; less than 0.01 sulfur; less than about 0.01 boron; less than 0.02 phosphorous; and balance nickel and incidental impurities.

18. The article of claim 17, comprising 0.30 to 0.95 manganese, 0.002 to 0.10 zirconium, 0.001 to 0.01 boron, and 0.10 to 0.30 silicon.

* * * * *